Patented Oct. 28, 1930

1,779,846

UNITED STATES PATENT OFFICE

ISADORE M. JACOBSOHN, OF CHICAGO, ILLINOIS, AND STARR TRUSCOTT, OF BIRMINGHAM, OHIO

AIRCRAFT COVERING

No Drawing.   Application filed March 5, 1926. Serial No. 92,643.

(GRANTED UNDER THE ACT OF MARCH 3, 1883, AS AMENDED APRIL 30, 1928; 370 O. G. 757)

This invention relates to improvements in fabric for use on aircraft and more particularly to an impermeable gas retaining fabric particularly adapted for use on aerostats or airships.

It is, however, to be understood that without material modification the fabric is applicable to various other uses and applications.

Heretofore to a large extent goldbeater skins have been used as a base in the manufacture of aircraft fabric, the skins being subsequently suitably treated as desired. This, however, may be open to various objections such as excessive cost, difficulty in manufacture and handling and deterioration in the course of time.

The fabric hereinafter described is intended to overcome the above among other disadvantages. It has been found that rubber composition prepared by spraying into a heated chamber or drying by other means of evaporation mixtures of rubber latex with one or any combination of the following ingredients produces a substance which when properly applied to a basic fabric has a very high resistance to the passage of buoyant gases. The materials used may be carbohydrates, e. g., glucose; water soluble derivatives of carbohydrates, e. g., sodium salt of the cellulose ether of glycollic acid; commercial syrups, e. g., corn syrup; polyhydric alcohols, e. g., glycerol; water soluble derivatives of the polyhydric alcohols, e. g., diacetin; gelatine or glue. These materials may be added to the rubber latex in the form of their aqueous solutions. In the cases of the sodium salt of the cellulose ether of glycollic acid, water soluble carbohydrates, and glue the added substances are miscible in all proportions with rubber latex. In the cases of the glucose, carbohydrates, commercial syrups, corn syrup, glycerine, polyhydric alcohol, diacetin, water soluble derivatives of polyhydric alcohols 50 grams of the added substances are miscible with 1500 grams of latex. This proportion is not, however, the limiting proportion of material that can be used.

The following is a specific example of the manufacture of the preparation: ten grams of gelatine are dissolved in 100 cc. of water. Ten grams of glycerol are added to this solution. The whole is mixed well and then stirred into 1500 grams of rubber latex until the mass is uniform throughout. The resultant mass is dried by spraying into a heated chamber, a current of warm air passing through this chamber to remove the water vapor. The rubber, which precipitates in the form of a snow, is compressed into a solid cake. This cake of rubber is then milled to a suitable consistency and the milled rubber is dissolved in twelve parts by weight of benzene and spread, with a mechanical spreader, on a light weight cloth, to a total weight of four ounces per square yard. The fabric is then vulcanized in the cold by immersion in a 2% solution of sulfur monochloride.

As with goldbeaters skin fabric, the rubberized surface is placed on the interior of the fabric and in contact with the buoyant gas. Since the presence of glycerol in the rubber film renders it hydroscopic, a thin coat of varnish or other proofing may be applied to one or both surfaces to protect it from moisture. Such proofing does not affect the essential features of the fabric.

We do not limit ourselves to the spray method of removing volatile matter from the rubber mixture. Any means of evaporation may be used. We do not limit ourselves to the use of benzene as a solvent for the rubber composition. We do not limit ourselves to the sulfur monochloride method of vulcanization. Whenever desirable, sulfur, or other vulcanizing agents, accelerators, activators, and anti-oxidants may be introduced directly into the latex or may be added to the dried latex during the operation of milling, and the finished fabric vulcanized by heat treatment or at room temperatures, according to the nature of the vulcanizing agents and accelerators used. We do not limit ourselves to the application to a balloon cloth by means of a spreader. The rubber may, if desired, be calendered into thin sheets and applied to a balloon cloth by means of a suitable adhesive.

It will thus be seen that the present invention contemplates the preparation of an impermeable fabric particularly adapted for the purpose herein set forth and designed to accomplish, among others, all of the various objects and advantages herein stated.

The invention herein described may be manufactured and used by or for the Government of the United States for governmental purposes without the payment to us of any royalty thereon or therefor.

What we claim is:—

1. An aircraft fabric comprising a base fabric and a coating containing gelatine, glycerol and rubber dissolved in benzene and mechanically spread upon the fabric.

2. An impermeable cloth comprising a base fabric and a coating containing rubber and diacetin.

3. A process of making an aircraft covering which comprises applying to a base fabric a mixture of dried rubber and a polyhydric alcohol which has been milled and dispersed in an organic solvent.

Signed at Washington, District of Columbia, this 13th day of November, 1925.

ISADORE M. JACOBSOHN.
STARR TRUSCOTT.